United States Patent Office 2,726,948
Patented Dec. 13, 1955

2,726,948

CHARCOAL IN A SEED INOCULANT AND METHOD OF MANUFACTURE

Robert M. Erickson, Columbus, Ohio, assignor to Agricultural Laboratories, Inc., Columbus, Ohio, a corporation of Ohio No Drawing. Application August 2, 1952,
Serial No. 302,421

15 Claims. (Cl. 71—7)

This invention relates to an inoculant which is particularly useful in the inoculation of seeds of leguminous plants.

Certain plant species of the family Leguminosae when grown in symbiotic relationship with certain bacteria of the genus Rhizobium fix the nitrogen of the air and convert it to organic nitrogenous compounds. The nitrogen containing compounds thus formed enrich the soil around the plants and provide a nitrogenous nutrient for other crops which are incapable of fixing nitrogen. Among the plant species capable of fixing nitrogen in combination with the Rhizobia are alfalfa, clovers, peas, beans, soy beans, lupines and trefoil. The roots of these plants are infected by the bacteria resulting in a nodule formation on the root in the soil and nitrogen fixation is considered to occur within this nodule although the exact mechanism of the reaction involved is not presently known.

Adequate nodule formation is not produced on all of the plants by any one species of Rhizobia; thus the species *Rhizobium meliloti* is suitable for the infection of the roots of the alfalfa and white or sweet clover; *Rhizobium trifolii* infects the red, white and crimson clovers; *Rhizobium leguminosarum* infects garden peas and vetch; *Rhizobium lupini* will infect the lupines and *Rhizobium japonicum* the soy beans while *Rhizobium phaseoli* is effective with garden beans, etc. The group of plants which is infected by a single species of bacteria is known as a cross-inoculation group and approximately six such species of bacteria are effective with six correspondingly well defined cross-inoculation groups.

It is the present general practice to treat the seeds of the plant to be grown with a commercially prepared inoculant having therein the Rhizobia bacterial species which is effective with the particular plant. The inoculant may contain in addition other species of Rhizobia bacteria thus rendering the inoculant suitable for more than one particular cross-inoculation group.

The bacteria are carried in the inoculant in a base material or carrying medium. This medium generally consists of peat or humus which may serve to provide a nutrient for the bacteria in order that they may thrive until the time of application to the seed.

Humus is a brown or black material formed by the partial decomposition of animal or vegetable matter and is accordingly an organic portion of soil. Peat is a semi-carbonized vegetable tissue formed by the partial decomposition in water of various plants. These media as they exist in nature are normally acidic in character and retain their acid reacting properties when processed for commercial distribution. This property of acidity is deleterious to the bacteria when the same are inoculated into the acidic peat or humus as it results in a high mortality rate of the bacteria, thus rendering the product processed for commercial distribution at least partially ineffective.

Peat and humus are frequently considered to be substantially similar as regards their application to soil and accordingly hereinafter where peat or a carrier is referred to it will be understood that the various varieties of peat and humus are included in these terms.

While consideration has been given to the production of neutral inoculants a high mortality rate occurs in such inoculants prior to the neutralization due to contact of the acid peat with the bacteria.

It has been found that if charcoal, which similarly to peat may act as a bodying or carrying medium for the bacteria, is combined with the peat initially, and the bacteria introduced to the mixture in sterile water, that the initial mortality among the bacteria is substantially overcome, and a more efficient product results. This result is considered to be attained because the alkaline constituents of the charcoal immediately neutralize the acidic peat, presenting to the bacteria a neutral carrier and accordingly the mortality in the inoculant is materially reduced.

The charcoal which is in finely divided condition has the further effect of providing a good adherence of the inoculant to the seed, a factor which is of particular importance in dry applications.

It is, therefore, a particular object of this invention to provide a new and novel legume inoculant.

It is an important object of this invention to provide a new and novel neutral legume inoculant containing charcoal.

It is a particular object of this invention to provide a new and novel neutral legume inoculant having a distinct capacity for adherence to seed when applied in the dry state.

These and other allied objectives are attained by combining the acidic peat with charcoal having alkaline characteristics, each constituent being present in such proportions that the alkalinity of the charcoal may neutralize the acid peat; after thorough mixing, the bacteria contained in a quantity of sterile water is added to the mixture, the water being present in sufficient proportion to insure that the neutralization reaction between the acid peat and alkaline charcoal will occur to form a neutral inoculant.

The invention will be more fully understood by reference to the following specific example which is set forth by way of illustration only and is not to be considered as limitative of the inventive concept.

An example of a particularly efficient inoculant is:

| | Percent |
|---|---|
| Liquid suspension of bacteria | 33.4 |
| Peat, 60 mesh | 35.3 |
| Peat, 200 mesh (heat treated) | 18.9 |
| Charcoal, 200 mesh | 11.9 |
| Limestone, 100 mesh | 0.5 |

In the above formulation the peat, alkaline charcoal and limestone in a thoroughly dry state are first well mixed together.

The 200 mesh peat portion is heated before mixing at a temperature sufficient to insure of the removal of all moisture therefrom and which also results in a slight carbonization of some of the organic constituents. This temperature may be about 2200° F. and some sterilization of the bacteria naturally occurring therein may result, but this is not harmful.

The peat (60 mesh) is heated at a sufficient temperature (1200° F.) to remove substantially all moisture therefrom, but is not heated to the extent that carbonization charring occurs.

The charcoal is preferably a commercial air blown product derived from naturally occurring materials such as hardwood and has a moisture content of 3.8% and the following analysis on a dry weight basis:

| | Percent (moisture free basis) |
|---|---|
| Volatile matter | 18.8 |
| Ash | 7.0 |
| Fixed carbon | 74.2 |

This alkaline charcoal is ground and sieved to about a 200 mesh particle size.

The calcium carbonate or limestone is similarly ground and sieved to about the 100 mesh noted. The limestone may be of ordinary commercial quality and serves as a buffer in the inoculant.

These materials, the peats, charcoal and limestone are thoroughly mixed in the dry state and contain only such moisture as may be absorbed from the atmosphere.

In order to determine the necessary quantity of alkaline charcoal to be added to the acid peat it is only necessary to proportion a small known amount of the peat in water and then add charcoal until the liquid mix shows a neutral reaction with litmus or other indicator, or a hydrogen electrode determination may be employed on the liquid of the mix. The same proportions of peat and charcoal should then be employed on the dry mix.

The nodule Rhizobia bacteria cultures are prepared by spraying under sterile conditions a suspension of pure nodule bacteria on the surface of hardened nutrient, agar preferably in sterilized glass bottles having sterilized metal caps. The inoculated bottles are incubated at the proper temperature for the organisms and then a quantity of sterile water is added to the organisms. The organisms and water are then mixed with the dry mix of peat, charcoal and limestone, the water being present to the extent of about 38% by weight of the whole. This insures that sufficient water is present to effect neutralization promptly. The mix should be well agitated during this period as heat is evolved from the neutralization reaction and must be readily dissipated.

Where more than one species of bacteria is employed each species is added separately. Under this condition the total sterile water added should be about 38–40% by weight of the whole, which as already noted is sufficient for the formation of the neutral inoculant.

The absorptive capacities of the peat-charcoal mass are such that the neutral product will have a dry appearance despite the presence of the water. Accordingly the material is ready for packaging substantially immediately after the bacteria have been thoroughly mixed therein. The packaged product is effective even though the mix is not exactly neutral; a very slight alkalinity or acidity is not harmful.

The product demonstrates particular advantages when applied to seed in the dry state which type of application is essential where the seed has been treated with a disinfectant of the kind harmful to bacteria. The absence of water prevents any leaching of the disinfectant to the bacteria during the inoculant application.

The charcoal accordingly performs the dual functions of (1) neutralization and (2) improved adherence to the seed in the dry state while the peat provides a sufficient bodying agent to assist the action of the charcoal in its adherent qualities.

It will be understood that this invention is susceptible to modification in order to adapt it to different usages and conditions and accordingly, it is desired to comprehend such modifications within this invention as may fall within the scope of the appended claims.

I claim:

1. A neutral legume inoculant suitable for packaging comprising bacteria of at least one species of the genus Rhizobium and a finely divided carrier for the bacteria consisting essentially of a mixture of acidic, heat-treated peat and air-blown alkaline wood charcoal, said mixture being of substantially dry appearance but containing absorbed moisture and the peat and charcoal components thereof being mixed in proportions such that in the presence of the absorbed moisture the acids of the peat are substantially neutralized by the alkali of the charcoal, said inoculant being characterized in that, in the substantially dry condition, it adheres to seed.

2. A neutral legume inoculant suitable for packaging comprising bacteria of at least one species of the genus Rhizobium and a finely divided carrier for the bacteria consisting essentially of (a) a mixture of acidic, heat-treated peat and air-blown alkaline wood charcoal, said mixture being of substantially dry appearance but containing absorbed moisture and the peat and charcoal components thereof being mixed in proportions such that in the presence of the absorbed moisture the acids of the peat are substantially neutralized by the alkali of the charcoal and (b) an amount of limestone sufficient only to buffer the mixture (a) in substantially neutral condition, said inoculant being characterized in that, in substantially dry condition, it adheres to seed.

3. A neutral legume inoculant suitable for packaging comprising bacteria of at least one species of the genus Rhizobium and a finely divided, substantially neutral carrier for the bacteria which consists essentially of a mixture of acidic peat heat-treated to partially carbonized condition, heat-treated substantially uncharred peat, and air-blown alkaline wood charcoal, said mixture being of substantially dry appearance but containing absorbed moisture and the peat and charcoal components thereof being mixed in proportions such that, in the presence of the absorbed moisture, the acids of the peat are substantially neutralized by the alkali of the charcoal, said inoculant being characterized in that, in substantially dry condition, it adheres to seed.

4. A neutral legume inoculant suitable for packaging comprising bacteria of at least one species of the genus Rhizobium and a finely divided carrier for the bacteria consisting essentially of a mixture of about 54.2 parts by weight of acidic, heat-treated peat and about 11.9 parts by weight of air-blown alkaline wood charcoal, said mixture being of substantially dry appearance but containing absorbed moisture in an amount such that the acids of the peat are substantially neutralized by the alkali of the charcoal, said inoculant being characterized in that, in substantially dry condition, it adheres to seed.

5. A neutral legume inoculant suitable for packaging comprising bacteria of at least one species of the genus Rhizobium and a finely divided carrier for the bacteria consisting essentially of (a) a mixture of, by weight, about 18.9 parts of about 200 mesh acidic peat heat-treated to partially carbonized condition, about 35.3 parts of about 60 mesh acidic, heat-treated substantially uncharred peat and about 11.9 parts of about 200 mesh air-blown, alkaline wood charcoal, said mixture being of substantially dry appearance but containing an amount of absorbed moisture such that the acids of the peat are substantially neutralized by the alkali of the charcoal, and (b) about 0.05 part of 100-mesh limestone as buffer for the neutralized mixture (a), said inoculant being characterized in that, in substantially dry condition, it adheres to seed.

6. In a method of producing a neutral legume inoculant of substantially dry appearance, the step of adding an aqueous suspension of bacteria of at least one species of the genus Rhizobium to a finely divided carrier consisting essentially of a mixture of acidic, heat-treated peat and air-blown alkaline wood charcoal in proportions such that, on absorption of moisture to the extent that the mixture remains substantially dry in appearance, the acids of the peat are substantially neutralized by the alkali of the charcoal.

7. In a method of producing a neutral legume inoculant of substantially dry appearance, the step of adding an aqueous suspension of bacteria of at least one species of the genus Rhizobium to a finely divided carrier consisting essentially of (a) a mixture of acidic, heat-treated peat and air-blown alkaline wood charcoal in proportions such that, on absorption of moisture to the extent that the mixture remains substantially dry in appearance, the acids of the peat are substantially neutralized by the alkali of the charcoal, and (b) an amount of limestone sufficient only to buffer the mixture (a) in the substantially neutral condition.

8. In a method of producing a neutral legume inoculant of substantially dry appearance, the step of preparing a carrier for bacteria by mixing finely divided acidic, heat-treated peat and finely divided air-blown alkaline charcoal in proportions such that in the presence of moisture absorbed by the mixture to the extent that said mixture remains substantially dry in appearance, the acids of the peat are substantially neutralized by the alkali of the charcoal, exposing the mixture to moisture so that it absorbs moisture for said neutralization of the peat acids, and adding an aqueous suspension of bacteria of at leat one species of the genus Rhizobium to the substantially neutral carrier.

9. In a method of producing a neutral legume inoculant of substantially dry appearance, the step of adding an aqueous suspension of bacteria of at least one species of the genus Rhizobium to a carrier for the bacteria consisting essentially of a finely divided, acidic, heat-treated peat and finely divided, air-blown alkaline wood charcoal mixed in proportions such that the mixture absorbs the water introduced by the suspension of the bacteria while remaining substantially dry in appearance and the acids of the peat are substantially neutralized by the alkali of the charcoal in the presence of the absorbed water.

10. In a method of producing a neutral legume inoculant of substantially dry appearance, the step of adding an aqueous suspension of bacteria of at least one species of the genus Rizobium to a finely divided carrier consisting essentially of a mixture of acidic peat heat-treated to partially carbonized condition, acidic heat-treated substantially uncharred peat and air-blown alkaline wood charcoal in proportions such that, on absorption of moisture to the extent that the mixture remains substantially dry in appearance, the acids of the peat are substantially neutralized by the alkali of the charcoal.

11. In a method of producing a neutral legume inoculant of substantially dry appearance, the step of adding an aqueous suspension of bacteria of at least one species of the genus Rizobium to a finely divided carrier consisting essentially of (a) a mixture of acidic peat heat-treated to partially carbonized condition, acidic heat-treated substantially uncharred peat and air-blown alkaline wood charcoal in proportions such that, on absorption of moisture to the extent that the mixture remains substantially dry in appearance, the acids of the peat are substantially neutralized by the alkali of the charcoal, and (b) limestone in an amount sufficient only to buffer the mixture (a) in the substantially neutral condition.

12. In a method of producing a neutral legume inoculant of substantially dry appearance, the step of adding an aqueous suspension of bacteria of at least one species of the genus Rizobium to a finely divided carrier consisting essentially of a mixture of about 54.2 parts by weight of acidic, heat-treated peat and about 11.9 parts by weight of air-blown alkaline wood charcoal, whereby the acids of the peat are neutralized by the alkali of the charcoal in the presence of water absorbed by the mixture from the suspension of the bacteria.

13. In a method of producing a neutral legume inoculant of substantially dry appearance, the step of adding an aqueous suspension of bacteria of at least one species of the genus Rhizobium to a finely divided carrier for the bacteria consisting essentially of (a) a mixture of, by weight, about 18.9 parts of about 200-mesh acidic peat heat-treated to partially carbonized condition, about 35.3 parts of about 60-mesh acidic, heat-treated substantially uncharred peat and about 11.9 parts of about 200-mesh air-blown, alkaline wood charcoal, said mixture being characterized in that on absorption of moisture thereby to the extent that the mixture remains substantially dry in appearance, the acids of the peat are substantially neutralized by the alkali of the charcoal, and (b) about 0.05 part of limestone.

14. In a method of producing a neutral legume inoculant, the step of adding an aqueous suspension of bacteria of at least one species of the genus Rhizobium to a substantially dry, finely divided mixture of an acidic peat and air-blown alkaline wood charcoal whereby the acidic peat is neutralized by the alkali of the charcoal in the presence of the water introduced with the bacteria, the amount of water so introduced being such that the resulting inoculant has a substantially dry appearance.

15. In a method of producing a neutral legume inoculant, the steps of adding an aqueous suspension of bacteria of at least one species of the genus Rhizobium to a mixture of measured quantities of finely divided acidic peat and finely divided air-blown alkaline wood charcoal, and thoroughly agitating the mass, the acidic peat being neutralized by the alkaline charcoal in the presence of the water introduced with the bacteria and the amount of water so introduced being such that the resulting inoculant has a substantially dry appearance.

References Cited in the file of this patent

UNITED STATES PATENTS

| 1,320,701 | Manns | Nov. 4, 1919 |
| 2,031,308 | Grullemans | Feb. 18, 1936 |
| 2,200,532 | Bond | May 14, 1940 |

FOREIGN PATENTS

| 123 | Great Britain | 1853 |